United States Patent [19]

Switzer et al.

[11] Patent Number: 5,417,043
[45] Date of Patent: May 23, 1995

[54] NOTCHED BELTS FOR A BALER OF LARGE CYLINDRICAL BALES

[75] Inventors: Bruce Switzer; Adam Switzer, both of Burwell, Nebr.

[73] Assignee: Vermeer Manufacturing Company, Pella, Iowa

[21] Appl. No.: 303,231

[22] Filed: Sep. 8, 1994

[51] Int. Cl.⁶ ............................................. A01D 39/00
[52] U.S. Cl. ...................................... 56/341; 100/88; 100/89
[58] Field of Search ...................... 56/341; 100/88, 89; 474/249, 250, 251, 252

[56] References Cited

U.S. PATENT DOCUMENTS

| | | |
|---|---|---|
| 4,172,354 | 10/1979 | Vermeer et al. ....................... 56/341 |
| 4,244,167 | 1/1981 | Seefeld et al. ....................... 56/341 |
| 4,426,926 | 1/1984 | Soteropulos et al. ............ 56/341 X |
| 4,581,879 | 4/1986 | Anstey .................................. 56/341 |
| 4,648,239 | 3/1987 | Geiser et al. ......................... 56/341 |
| 4,707,974 | 11/1987 | Harthoorn ............................. 56/341 |
| 4,890,449 | 1/1990 | Hering . |
| 4,900,609 | 2/1990 | Arnold .............................. 56/341 X |
| 5,165,333 | 11/1992 | Ratzlaff et al. ................... 56/341 X |
| 5,193,450 | 3/1993 | Anderson ......................... 56/341 X |
| 5,228,280 | 7/1993 | Ratzlaff et al. ....................... 56/341 |
| 5,261,323 | 11/1993 | Gunther et al. .................. 56/341 X |

Primary Examiner—George A. Suchfield
Attorney, Agent, or Firm—Merchant, Gould, Smith, Edell, Welter & Schmidt

[57] ABSTRACT

An improvement to roll-forming baling machines of the type having a plurality of endless belts supported on belt rollers that extend between a pair of transversely opposite sidewalls. One or more notches are created in the outside edge of the pair of belts that travel adjacent the sidewalls of the baler machine. The notches act to provide a cleaning effect for the baling machine to remove crop material unincorporated into the forming bales from the areas which result in undesired accumulation of such crop material.

6 Claims, 4 Drawing Sheets

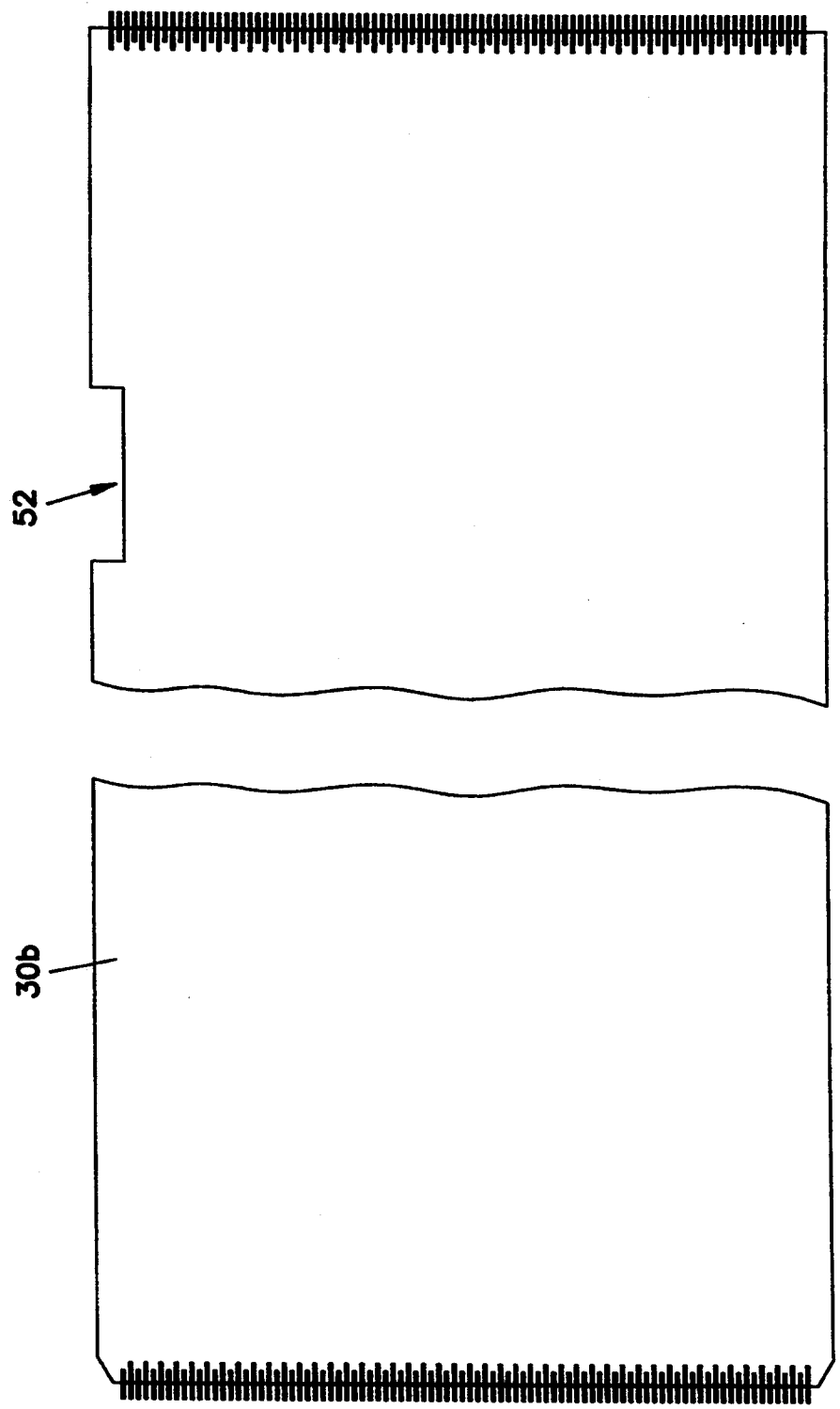

NOTCHED BELTS FOR A BALER OF LARGE CYLINDRICAL BALES

BACKGROUND OF THE INVENTION

The invention relates to balers of large cylindrical bales and, more particularly, to notches in the outside edges of belts of a roll-forming baler adjacent the side walls of the baler for capturing and conveying for release exteriorly of the baler crop material that remains unincorporated into a forming bale.

The baling industry was revolutionized in recent years by the introduction of baling machines that form large cylindrical bales of crop material having a diameter of up to about six feet and a length of up to about five feet. An example of such a baler is taught in U.S. Pat. No. 4,172,354. As is typical in such balers, the '354 patent teaches the use of a plurality of endless belts in a transversely spaced relation across the width of the baler to define a bale forming chamber. Crop material picked up by the baler is directed into a starting chamber where the belts assist in initially forming the material into a small diameter cylinder of a width extending between the sidewalls of the baler. As additional crop material is added to the starting bale, the belts continue to roll the added material onto the forming bale and the bale grows into a main baling chamber. Upon completion of a formed bale of the desired diameter, twine and/or a web of sheet or net material is wrapped around the circumferential periphery of the formed bale and it is ejected from the baling chamber.

It is not uncommon for crop material to accumulate forwardly of the baling chamber in a vertical run of the baler belts. The accumulated material can result in the baler belts moving off track and possibly crossing over each other, and increasing the wear experienced by the belts. Additionally, the accumulated crop material can collect to a degree that it obstructs the view of the operator of the baling machine to the operation of certain aspects of the baling machine.

SUMMARY OF THE INVENTION

The present invention provides a notch or notches in the outer edge of a bale-forming belt that travels adjacent to a side wall of a baling machine for forming cylindrical bales. The notches act to capture or entrain crop material present at the sidewalls of the baler that has not been incorporated into the forming bale. The captured crop material is conveyed by the notches and may become incorporated into the forming bale or released exteriorly of the baler. The notches, accordingly, provide a cleaning action to remove undesirable, loose crop material that may otherwise interfere with the efficient operation of the baling machine.

It is an object of the invention to provide notches in the outside bale-forming belts of a roll-forming baling machine to assist in cleaning unincorporated crop material out of the baling chamber.

It is another object of the invention to provide one or more notches in the outside edge of the outer pair of bale-forming belts which act to capture unincorporated crop material adjacent the side walls of the baling machine and convey the captured crop material for incorporation into the forming bale or release exteriorly of the baler.

These and other objects of the invention will be obvious to one skilled in the art upon review of the following description, attached drawings, and appended claims.

BRIEF DESCRIPTION OF THE DRAWINGS

FIG. 4 is a plan view of an alternative embodiment of the notched bale-forming belts of the present invention.

DETAILED DESCRIPTION OF A PREFERRED EMBODIMENT

Figure 1:
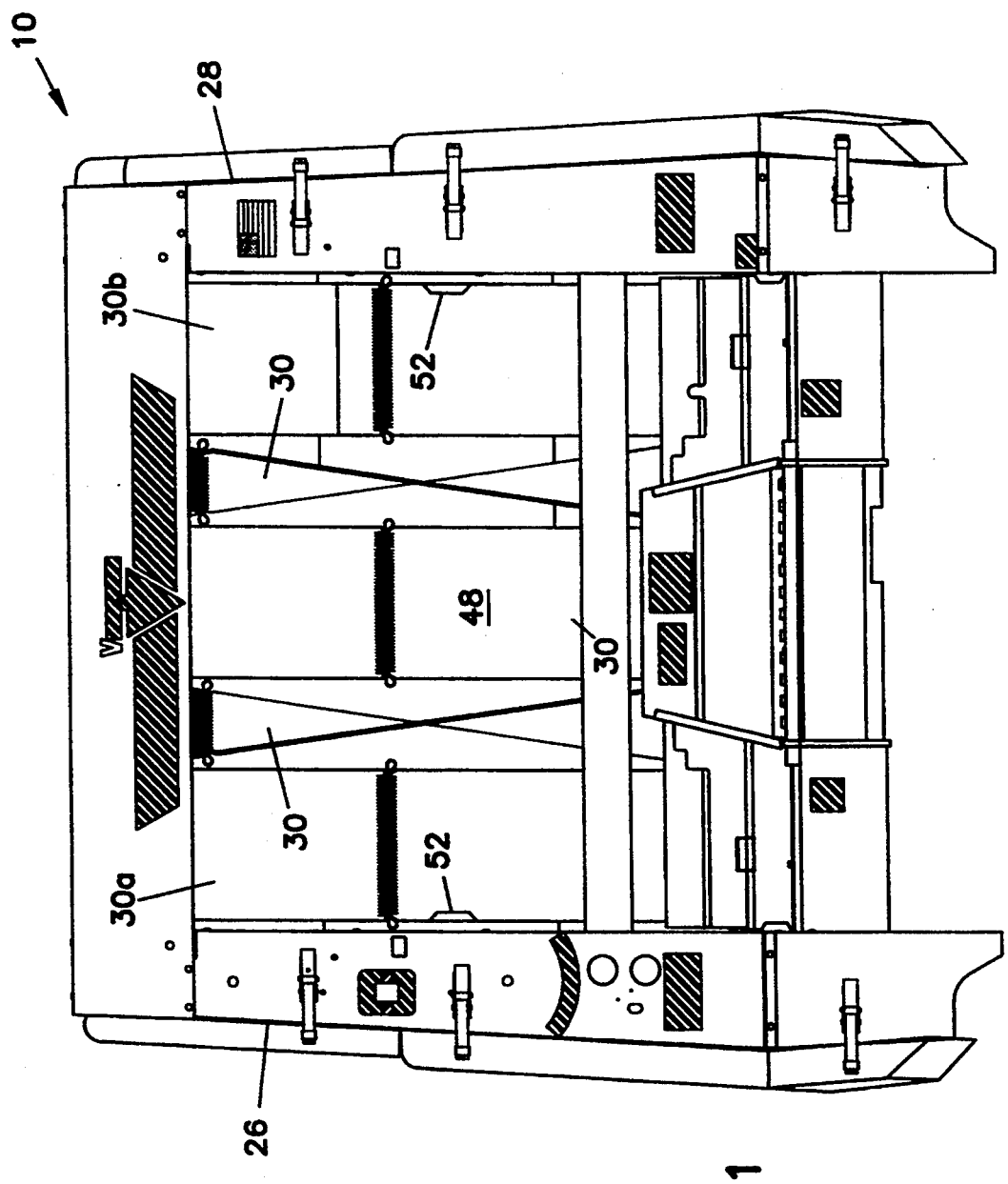
FIG. 1 is a front view of a baler of large cylindrical bales with parts broken away to show the endless bale-forming belts of the present invention.
Figure 2:
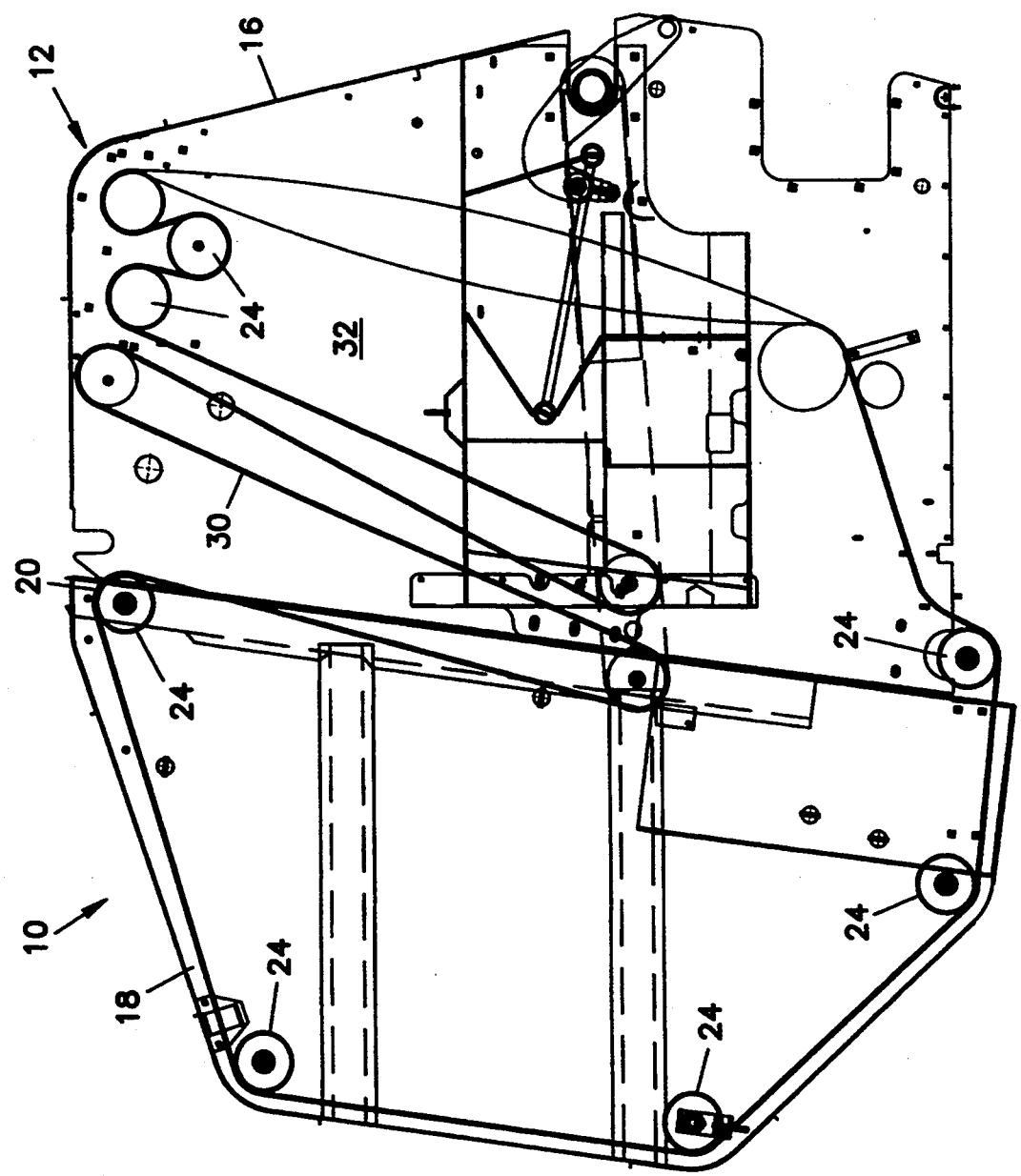
FIG. 2 is a side view corresponding to FIG. 1.

FIGS. 1 and 2 illustrate, generally at 10, a roll-forming baler machine for forming large cylindrical bales. The machine 10 includes a portable frame 12 mounted on ground wheels (not shown) and equipped with a front housing section 16 and a rear housing section 18 pivoted at on the front housing section for pivotal movement from the bale-forming position shown in FIG. 1 to a bale discharge position (not shown) projected upwardly and rearwardly from the pivot 20. A draft tongue (not shown) extends forwardly of the frame 12 for attachment to a tractor (not shown) which draws the machine.

A plurality of lateral rollers 24 extend the full width of the machine 10 and are supported at their end portions on the sidewalls 26 and 28 of the housing section 16. A plurality of endless belts 30 extend about the rollers 24 to define an expandable bale-forming chamber 32.

As the machine 10 is drawn forwardly over a windrow of crop material, such material is picked up by a pick-up unit and lifted upwardly and rearwardly into a material feed roller which feeds the crop material into engagement with the bale-forming belts 30 and into a starting chamber (as is conventional). When the bale core reaches a size to overcome the tension in the belts 30, it expands the belts 30 and is admitted entrance into the bale-forming chamber 32. Crop material from the feed roller is continuously fed into the bale-forming chamber to increase the size of the bale. Tension in the belts 30 is maintained by a tensioning mechanism (as is conventional).

The bale that is formed in the baling machine 10 extends across the full width of the machine from sidewall 26 to sidewall 28. Accordingly, crop material is present during formation of the bale at the junction between the sidewalls 26 and 28 and the rollers 24 and, of course, in the gaps between adjacent baler belts 30. Crop material that is unincorporated into the forming bale may pass from the baling chamber through the gaps between the belts 30 and the sidewalls 26 and 28 and between adjacent belts 30.

In the area forward of the baling chamber, indicated generally at 48, the vertical runs of the baler belts 30 run in opposite directions. This opposing movement, in combination with the action of gravity, results in very little net conveying action on crop material that enters the area 48, with the result that crop material tends to accumulate in the area 48. This crop material will reduce the efficiency of the baling machine 10 by causing tracking problems of the baler belts 30 and increasing the amount of wear experienced by the belts 30. In severe cases, the amount of crop material that accumulates in the gap 48 may obstruct the view of an operator of the baling machine 10 to certain of the parts and functions of the baling machine 10, in particular, the status of the bale core forming in the baling chamber 32.

Figure 3:
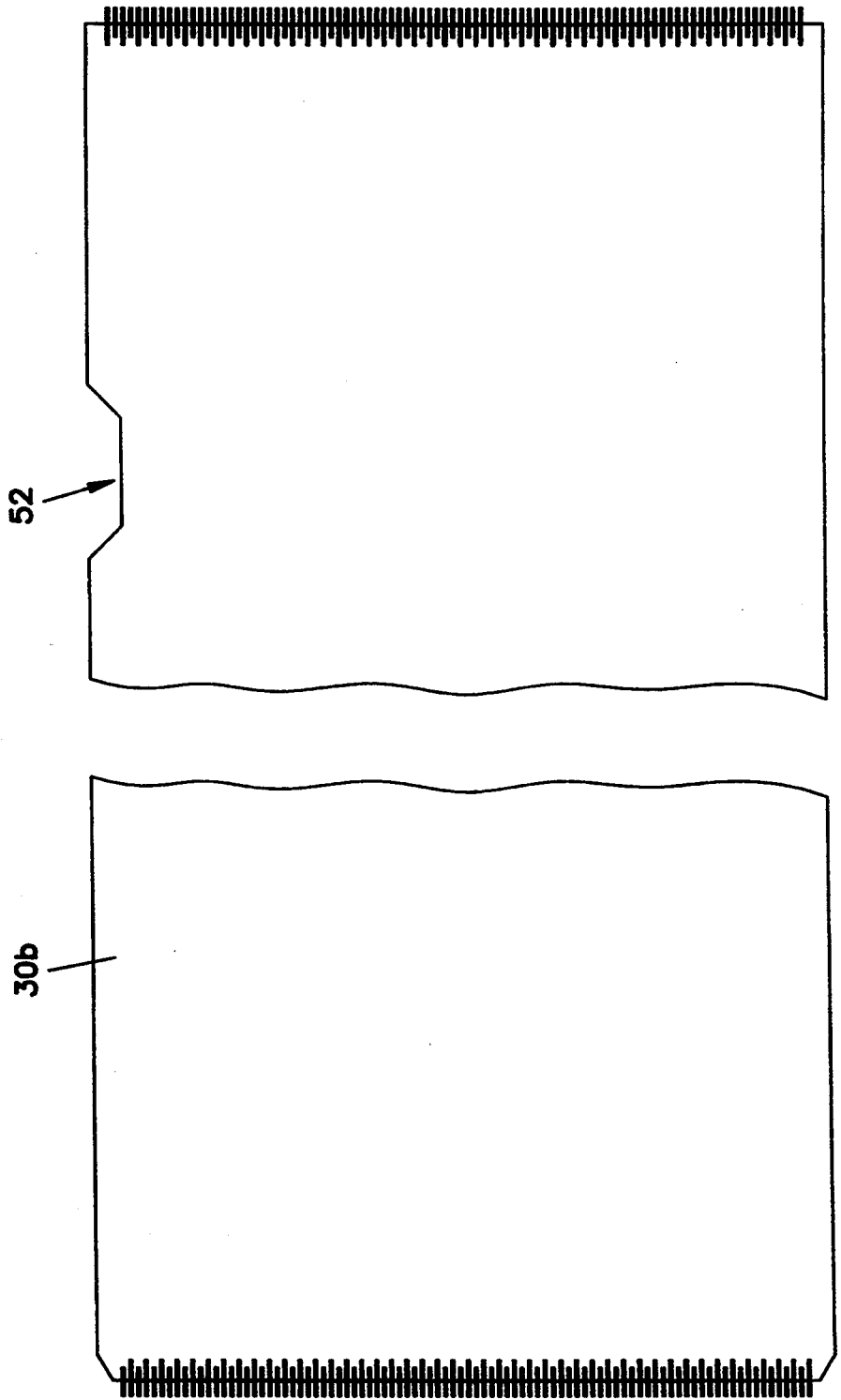
FIG. 3 is a plan view of one of the notched bale-forming belts of the present invention.

In the present invention, at least one notch 52 (FIG. 3) is created in the outside edge of the two belts 30*a* and 30*b* that are positioned adjacent the sidewalls 26 and 28 of the baler 10 (FIGS. 1 and 3). The notches 52 act to capture and entrain unincorporated crop material that is present in the area of travel of the notched belts 30*a* and 30*b*. Whereas with the customary, unnotched belts, the outside edge of the belt is continuous and moves past the unincorporated crop material, the notches 52 provide a means for picking up or capturing the crop material and to provide a conveying action. The action of the notches 52, accordingly, will tend to remove unincorporated crop material from the area 48 so that it may either be incorporated into the forming bale or released exteriorly of the baling chamber. In either event, the action of the notches is to prevent the accumulation of unincorporated crop material in the area 48 and, generally, to result in a cleaner baling machine.

As illustrated in FIGS. 3 and 4, the notches 52 are preferably of a trapezoidal shape (FIG. 3) or rectangular shape (FIG. 4). While one notch in each of the belts 30*a* and 30*b* is sufficient to provide the desired cleaning action, it is believed preferable to include between about three and about eight notches per belt. The efficiency of the cleaning action will depend on the conditions of the particular crop material being baled. It is believed that notches having a length of between about one-half inch and twelve inches will function adequately, with a preferred range of between about two inches and eight inches, and a depth of between about one-quarter inch and two inches, with a preferred depth of between about one-half and one inch.

Although the invention has been described with respect to a preferred embodiment thereof, it is to be also understood that it is not to be so limited since changes and modifications can be made therein which are within the full intended scope of this invention as defined by the appended claims.

We claim:

1. In a baling machine for forming rolled cylindrical bales of crop material, said baling machine having a pair of transversely opposite sidewalls, a plurality of belt rollers extended between said sidewalls, and a plurality of belts supported on said belt rollers in a space-apart relation, including one each of said belts being located adjacent a corresponding one of said sidewalls, the improvement comprising:
   (a) at least one notch in the outside edge of each of said sidewall adjacent belts for capturing crop material present at said sidewalls and unincorporated into the forming bale and conveying said captured crop material for incorporation into the forming bale or for release exteriorly of the baling machine.

2. A baling machine as defined in claim 1, wherein said notches have a length longitudinally of the belt of between about one-half inch and about 12 inches and a depth transversely of the belt between about one-quarter inch and about two inches.

3. A baling machine as defined in claim 2, wherein said notch is of a rectangular shape.

4. A baling machine as defined in claim 2, wherein said notch is of a trapezoidal shape.

5. A baling machine as defined in claim 1, wherein said notches are spaced at regular intervals along said belt.

6. In a baling machine for forming rolled cylindrical bales of crop material, said baling machine having a pair of transversely opposite sidewalls, a plurality of belt rollers extended between said sidewalls, and a plurality of belts supported on said belt rollers in a spaced-apart relation, including one each of said belts being located adjacent a corresponding one of said sidewalls, the improvement comprising:
   (a) each of said sidewall adjacent belts having a non-continuous edge which acts to capture crop material at said sidewalls and unincorporated in the forming bale and conveying said captured crop material for incorporation in the forming bale for release exteriorly of the baling machine; and
   (b) said edge non-continuities include at least one notch formed in the outside edge of said sidewall adjacent belts.

* * * * *